UNITED STATES PATENT OFFICE.

WILLIAM AUGUSTUS BALDWIN, OF CHICAGO, ILLINOIS, ASSIGNOR, BY DIRECT AND MESNE ASSIGNMENTS, TO THE ALUMINIUM PROCESS COMPANY, OF WASHINGTON, DISTRICT OF COLUMBIA.

METHOD OF MAKING ALUMINUM ALLOYS.

SPECIFICATION forming part of Letters Patent No. 394,091, dated December 4, 1888.

Application filed April 14, 1887. Serial No. 234,819. (No specimens.)

*To all whom it may concern:*

Be it known that I, WILLIAM AUGUSTUS BALDWIN, a citizen of the United States, residing at Chicago, in the county of Cook and State of Illinois, have invented a new and useful Improvement in Method of Making Aluminum Alloys; and I do declare the following to be a full, clear, and exact description of the invention, such as will enable others skilled in the art to which it appertains to make and use the same.

This invention has relation to means for extracting aluminum from clay and other substances holding alumina; and it consists in the novel method hereinafter specified and claimed.

In carrying out my method I first take clay, corundum, bauxite, or other substance holding alumina, and reduce it to a fine powder. I next take common salt and pulverized charcoal and iron—scraps, bars, or pigs—and place the four ingredients in a fusing-pot, in about the following proportions, namely: clay, one part; charcoal, one-fourth part; salt, three parts, and iron, one part, by weight. The proportions mentioned above may be varied somewhat; but I have found them as given to be entirely operative and in all cases productive of the results desired. The next step in my process consists in thoroughly fusing the contents of the pot and then drawing off through a tap-hole or pouring said contents into molds adapted for their reception. The iron and aluminum become thoroughly combined during this treatment and fall to the bottom of the molds. The combined iron and aluminum may then be used as aluminum alloy, or said metals may be separated by the method used in chemical analysis for effecting such separation. Copper, silver, tin, and zinc may be employed in the place and instead of iron and in the same proportions. In employing zinc and tin, however, the contents of the pot must be fused before the zinc or tin is introduced, and the pot should be closed with a proper cover to guard the zinc or tin against combustion.

In my pending applications, numbered, respectively, 234,818, 234,820, and 234,821, I have described the fused bath of clay and the like, carbonaceous matter, and sodium chloride herein set forth; but in neither of said applications have I made claim to the process herein described and claimed.

I claim as my invention—

The method of extracting aluminum from clay and like earths bearing alumina and combining it with other metals, which consists in fusing salt, charcoal, metal, and earths bearing alumina in a suitable vessel, the salt being in excess of either of the other substances, whereby an alloy is formed of aluminum with the metal so fused.

In testimony whereof I affix my signature in presence of two witnesses.

WILLIAM AUGUSTUS BALDWIN.

Witnesses:
   THEO. MUNGEN,
   JAMES J. SHEEHY.